(No Model.)

D. V. BROWN.
SPECTACLES.

No. 316,873. Patented Apr. 28, 1885.

Witnesses:
Wilbb Powell
N. L. Collamer

Inventor
Daniel V. Brown
By Connolly Bros.
Attorneys

N. PETERS. Photo-Lithographer, Washington, D. C.

UNITED STATES PATENT OFFICE.

DANIEL V. BROWN, OF PHILADELPHIA, PENNSYLVANIA, ASSIGNOR TO SAMUEL L. FOX, TRADING AS JAMES W. QUEEN & CO., OF SAME PLACE.

SPECTACLES.

SPECIFICATION forming part of Letters Patent No. 316,873, dated April 28, 1885.

Application filed January 13, 1885. (No model.)

*To all whom it may concern:*

Be it known that I, DANIEL V. BROWN, a citizen of the United States, residing at Philadelphia, in the State of Pennsylvania, have invented certain new and useful Improvements in Spectacles; and I do hereby declare the following to be a full, clear, and exact description of the invention, reference being had to the accompanying drawings, which form part of this specification, in which—

Figure 1:
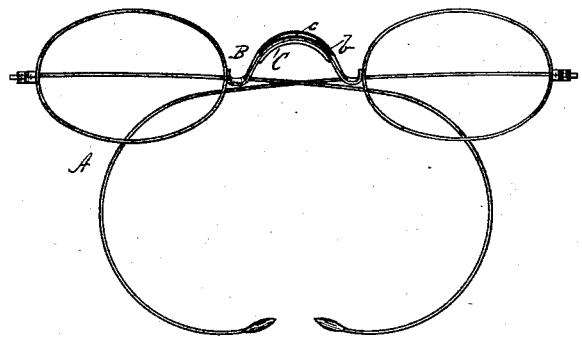
Figure 5:
Figure 4:
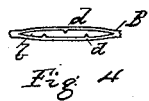
Figure 6:
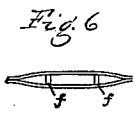
Figure 2:
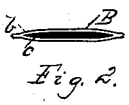
Figure 3:
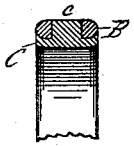

Figure 1 is an elevation of spectacle-frame with my improvements. Fig. 2 is plan of spectacle-bridge, and Fig. 3 a vertical transverse section, enlarged, of bridge with my improvements. Figs. 4, 5, and 6 are detail views of modifications.

My invention has relation to spectacles, and has for its object to provide the bridge thereof with a cushion or pad which will prevent injury to the skin of the nose of the wearer, and which will also serve to maintain the spectacles in position on the nose and prevent their slipping down thereon.

My invention consists in the combination, with a spectacle-bridge, of a cushion or pad of cork.

My invention further consists in constructing the bridge by forming a split or kerf therein for the reception of a cushion or pad.

My invention still further consists in the combination, with the split or slitted bridge of a spectacle-frame, of a pad or cushion of cork or equivalent material secured thereon, substantially as hereinafter described.

In spectacles as heretofore constructed the bridge has been composed of naked or unprotected wire. which by direct contact with the skin of the nose oftentimes causes abrasion and frequently painful soreness. Such metallic unprotected bridges also have a tendency to slip down on the nose of the wearer, rendering it difficult to maintain the lenses in due relation to the eyes. To remove these defects spectacle-bridges have sometimes been provided with a small plate of shell or rubber riveted to the bridge, which is bulky and unsightly in appearance, and the rivet-holes of which weaken the bridge.

By means of my improvement a neat and useful cushion is applied to the under side of the bridge, whereby an extended surface of contact of the bridge with the nose is afforded, permitting the wearing of heavy lenses with more comfort than heretofore. The material, cork, which I employ for such bridge-cushions is very light, so that the weight of the spectacles is not appreciably increased, while, at the same time, as such material possesses considerable adhesive or frictional properties, the cushion prevents the spectacles from slipping down on the nose, and so retains them in their proper position on that organ.

Referring to the accompanying drawings, A shows a spectacle-frame with my improvements applied thereto. B is the bridge, which is composed of wire of any suitable metal, and which is preferably oval in transverse section. Said bridge has formed in it a central longitudinal slit or kerf, $b$, which receives a rib, $c$, formed on a pad or cushion, C, of cork, that is applied to the under side of the bridge To fit the pad to the bridge the slit in the latter is distended to permit the free entrance of the pad-rib $c$, and the sides of the slit being then relieved or allowed to contract close toward each other, holding the rib firmly in their bite and securing the pad in a spring-clamp.

The manner of securing the cork pad in position may be varied, as shown in Figs. 4, 5, and 6. In Fig. 4 the inner walls of the split bridge or the sides of the slit are formed with points or teeth $d\ d$, which penetrate the edges of the pad C and hold the latter securely in place. In Figs. 5 and 6 the pad is held in place in the slit in the bridge by means of cross-bars $e\ e$ and $f\ f\ f$, which connect the sides of the slit, as shown.

What I claim as my invention is as follows:

1. The bridge of a spectacle-frame having a longitudinal slit or kerf, substantially as shown and described.

2. The combination, with the bridge B of spectacles having a central longitudinal slit or kerf, of a cork pad or cushion having a rib on its upper side which fits in and is clamped by the split bridge, substantially as shown and set forth.

In testimony that I claim the foregoing I have hereunto set my hand this 3d day of January, 1885.

DANIEL V. BROWN.

Witnesses:
EDWARD B. FOX,
W. T. ELLIOTT.